Jan. 6, 1925.  
E. B. LONG  
MOLDING MACHINE  
Filed June 4, 1920 16 Sheets-Sheet 6

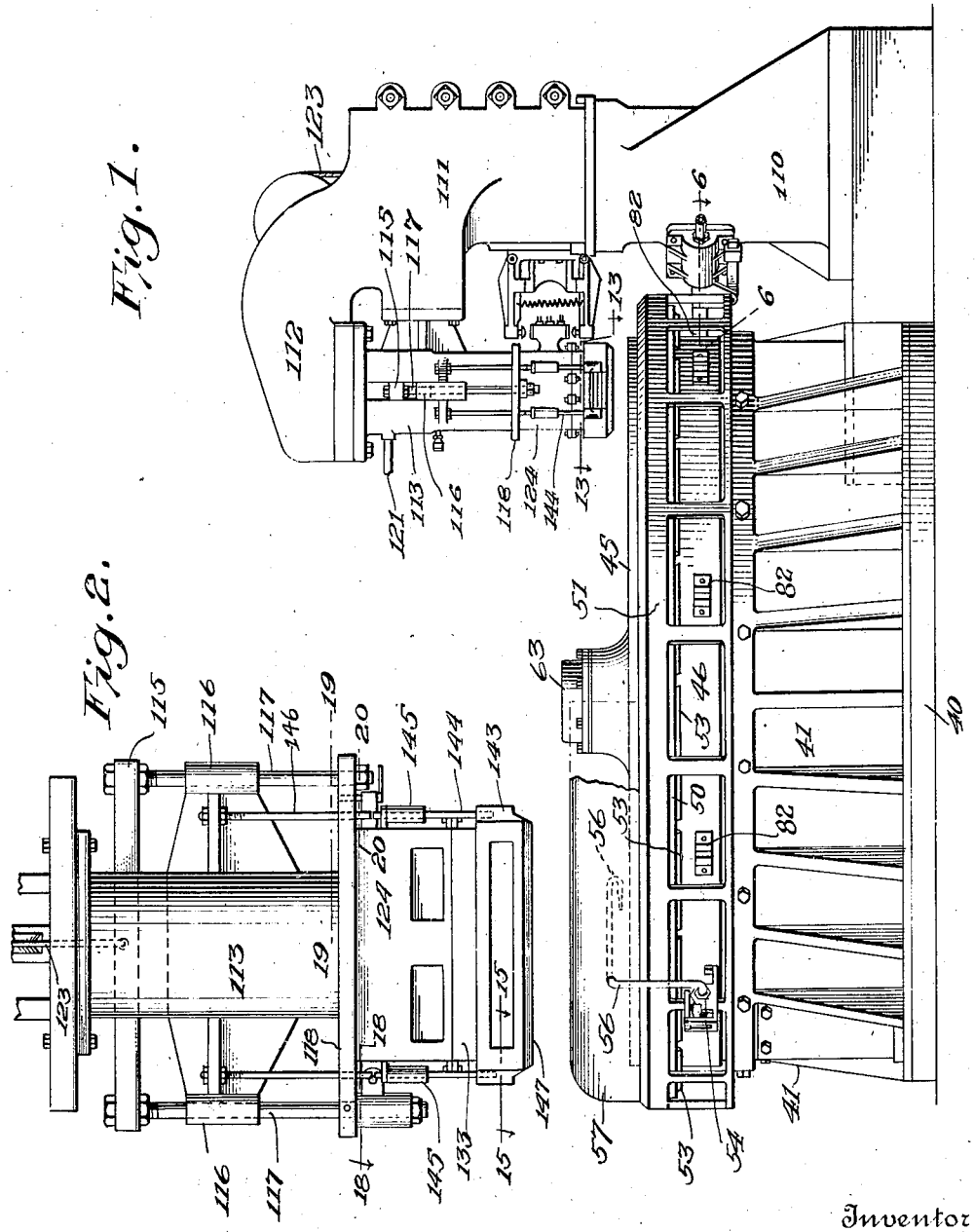

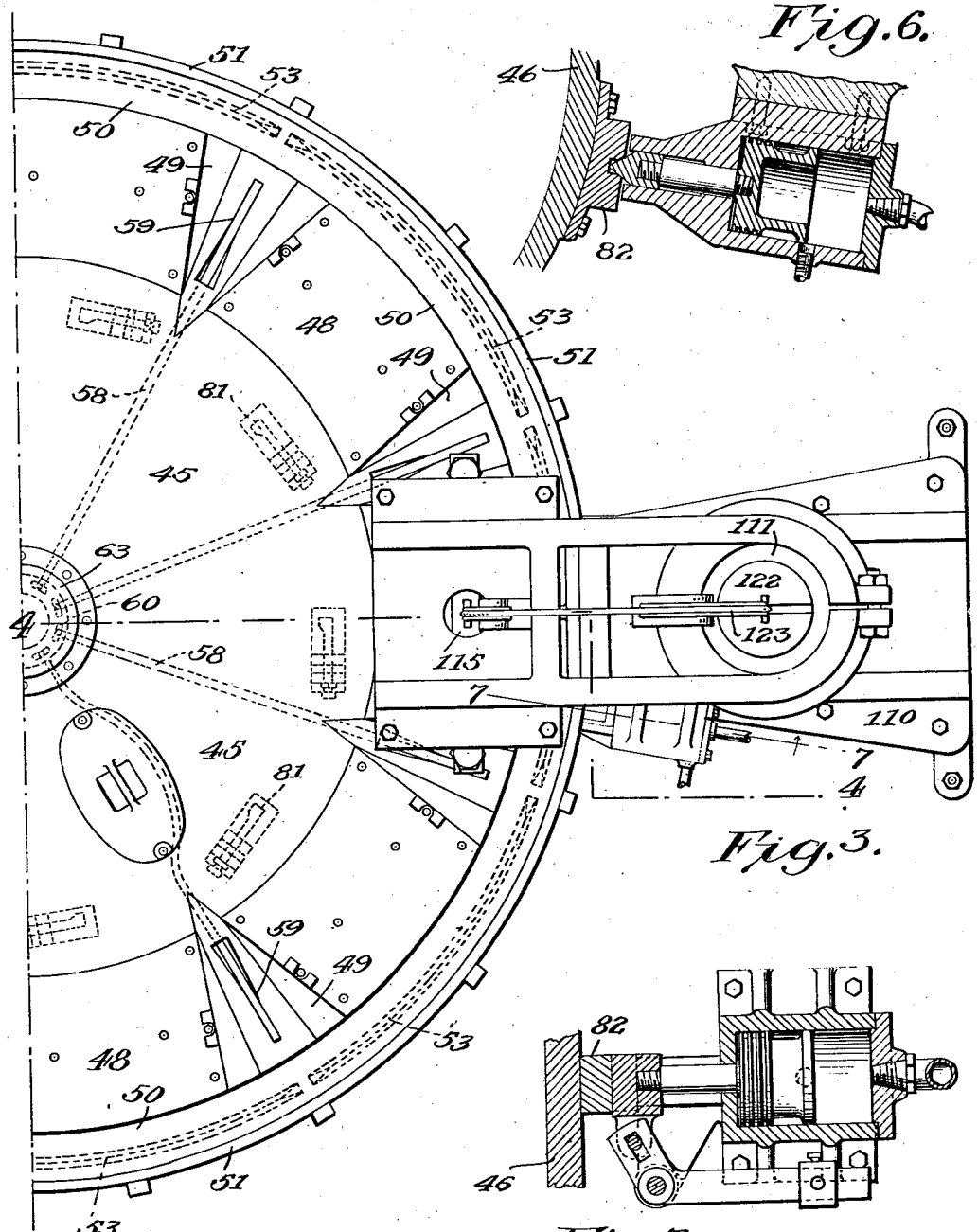

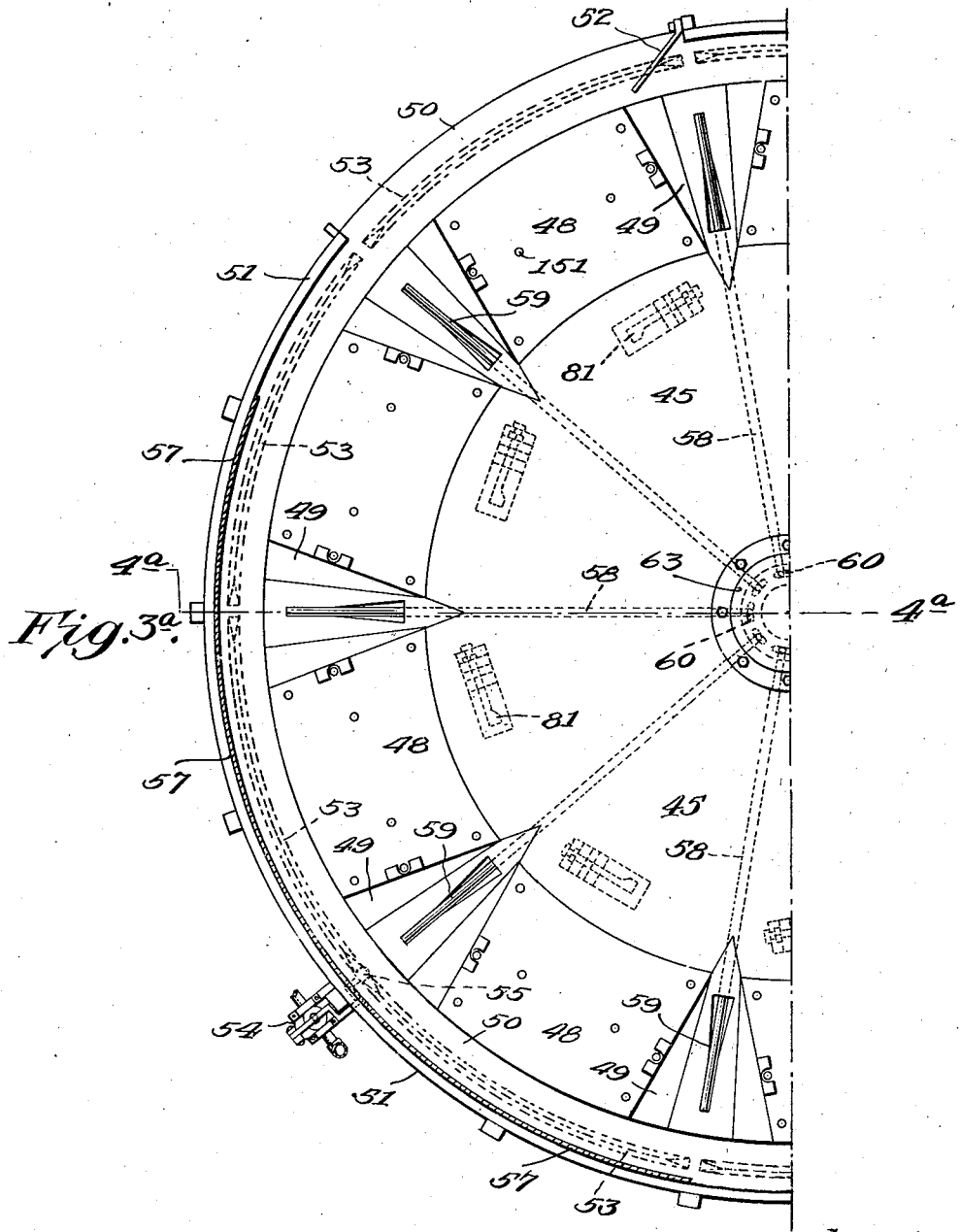

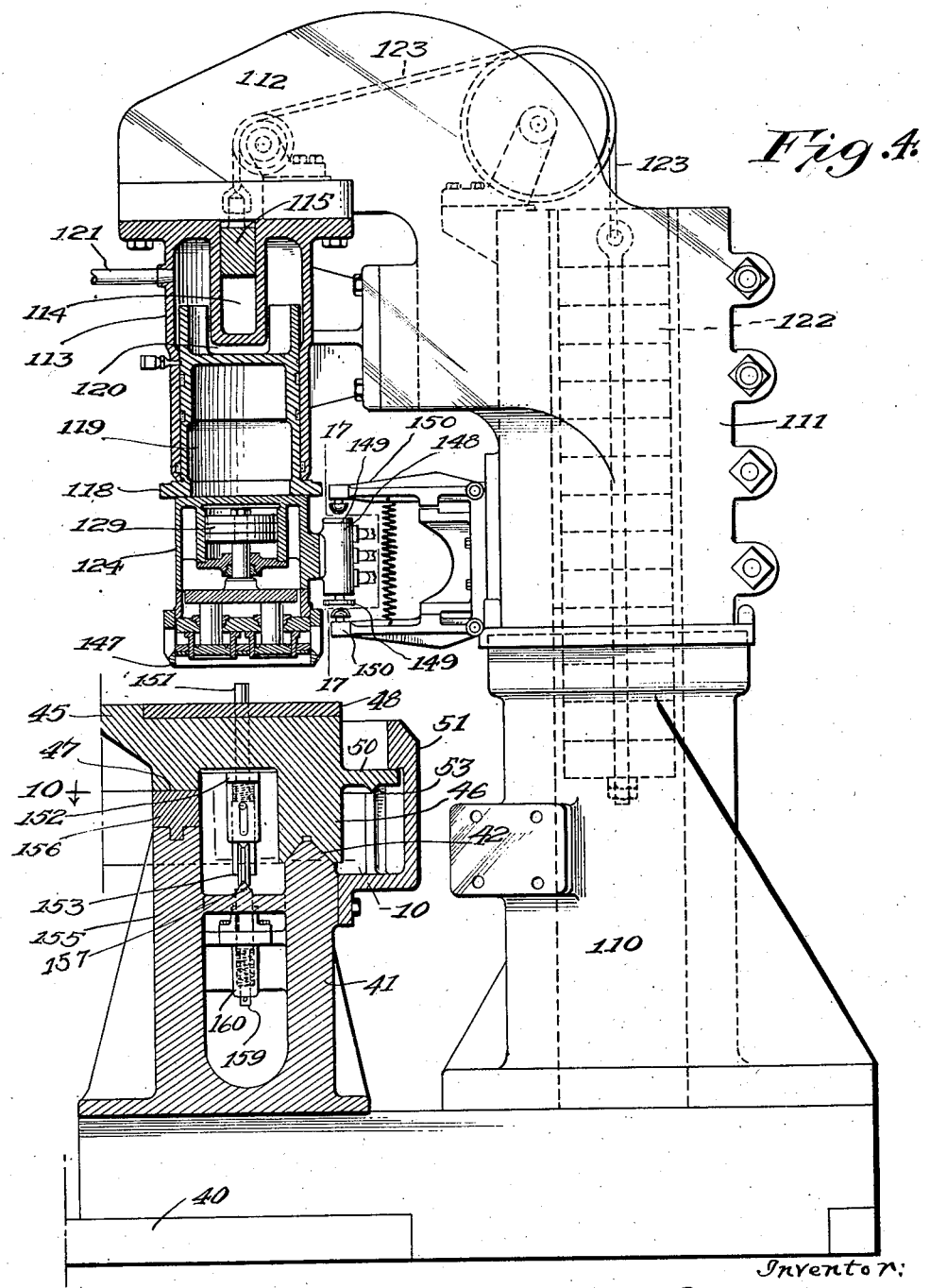

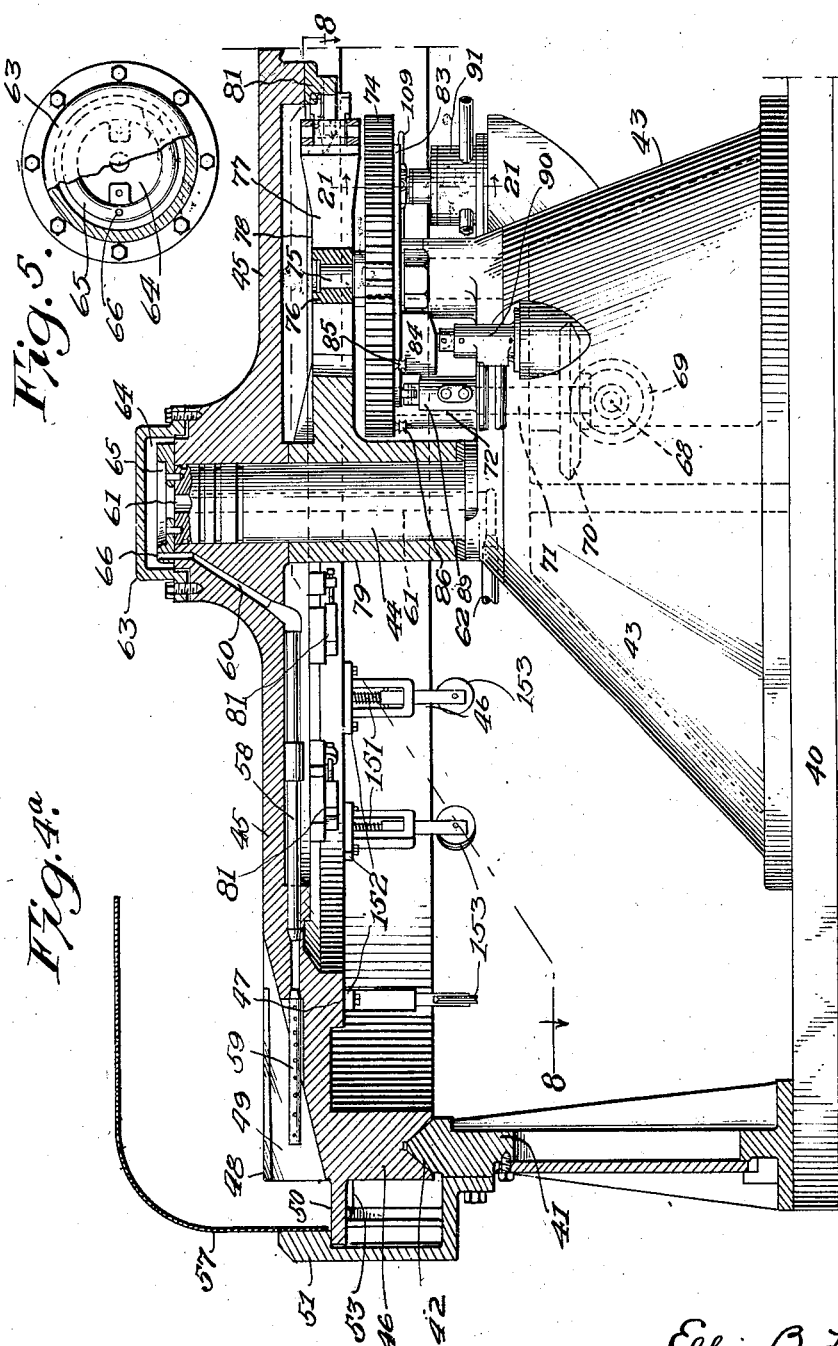

1,522,135

Inventor  
Ellis B. Long  
By  
Mann & Co  
Attorneys.

Jan. 6, 1925.
E. B. LONG
1,522,135
MOLDING MACHINE
Filed June 4, 1920     16 Sheets-Sheet 7
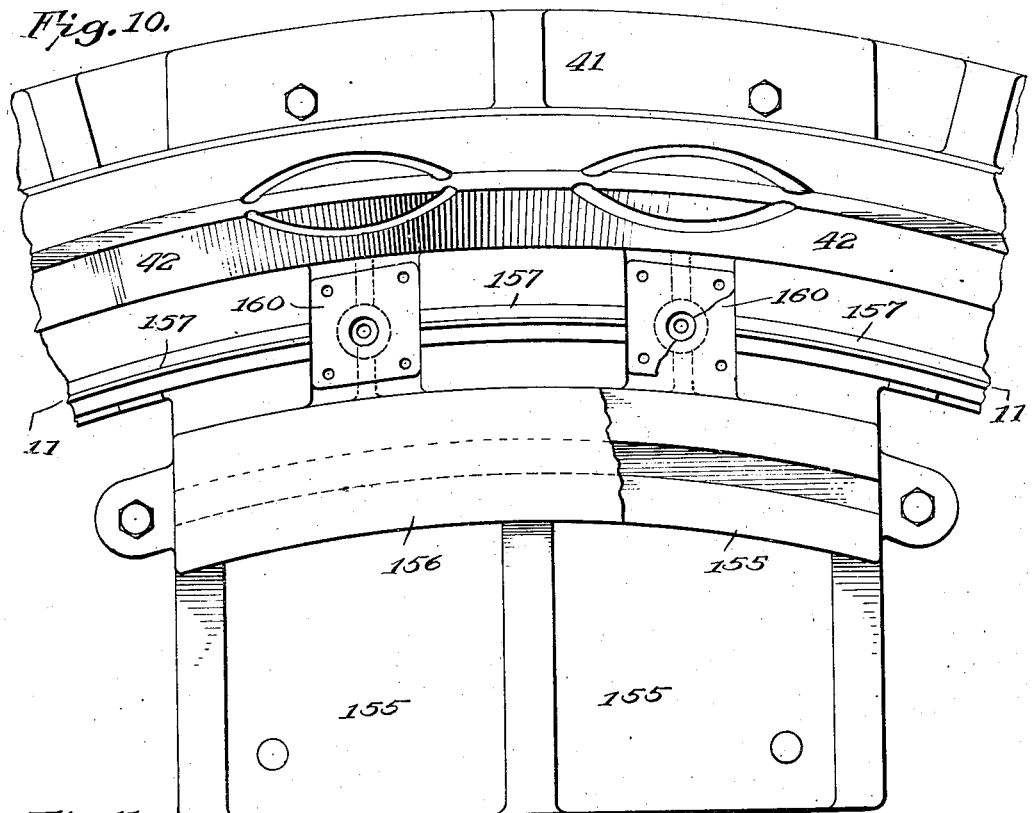
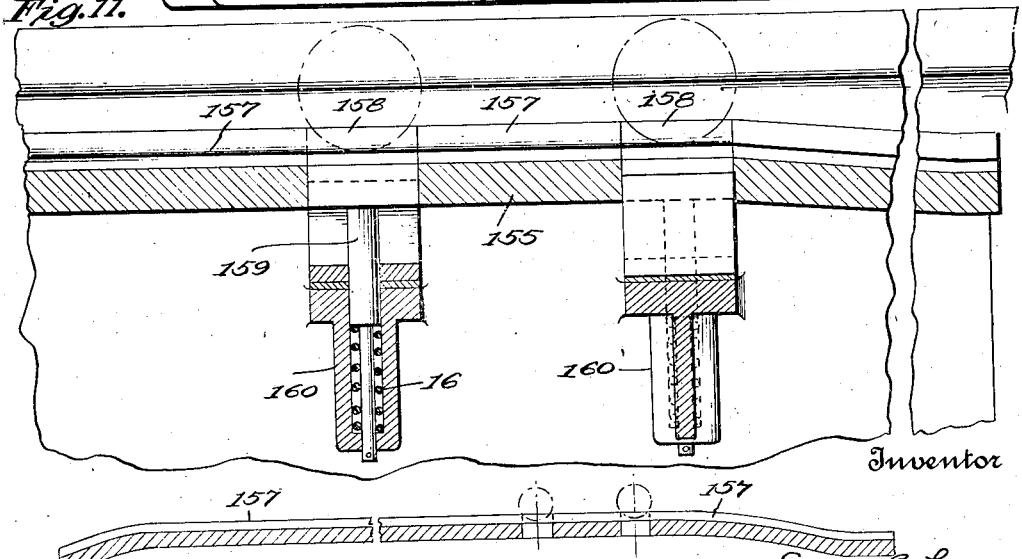
Inventor
Ellis B. Long
By
Mann & Co.
Attorneys.

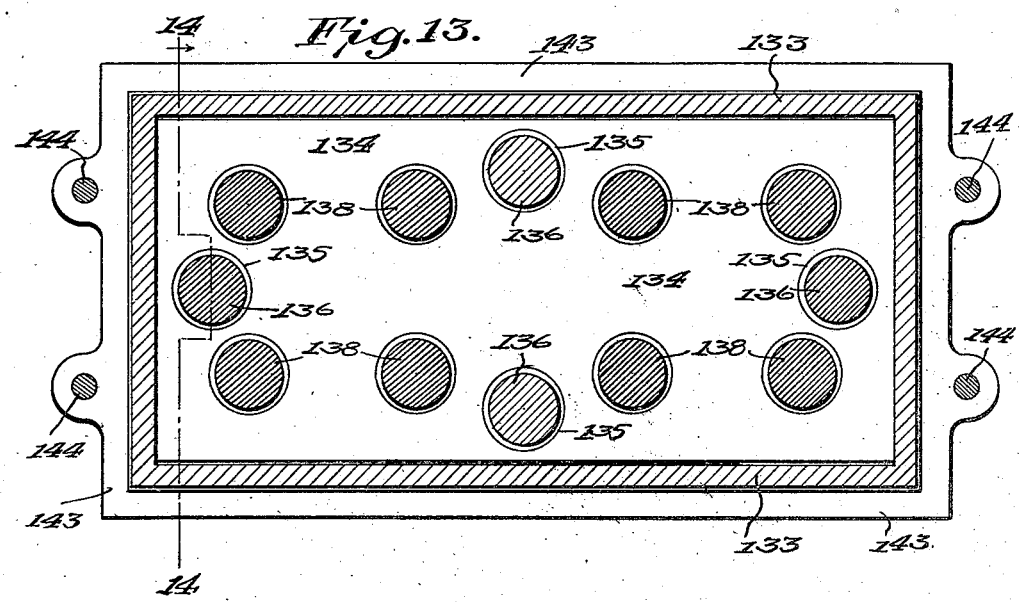
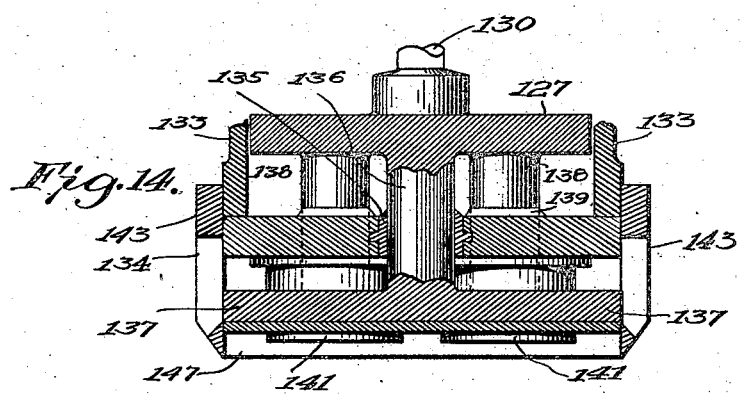
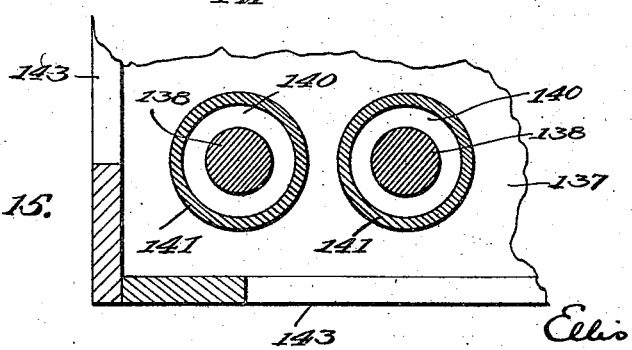

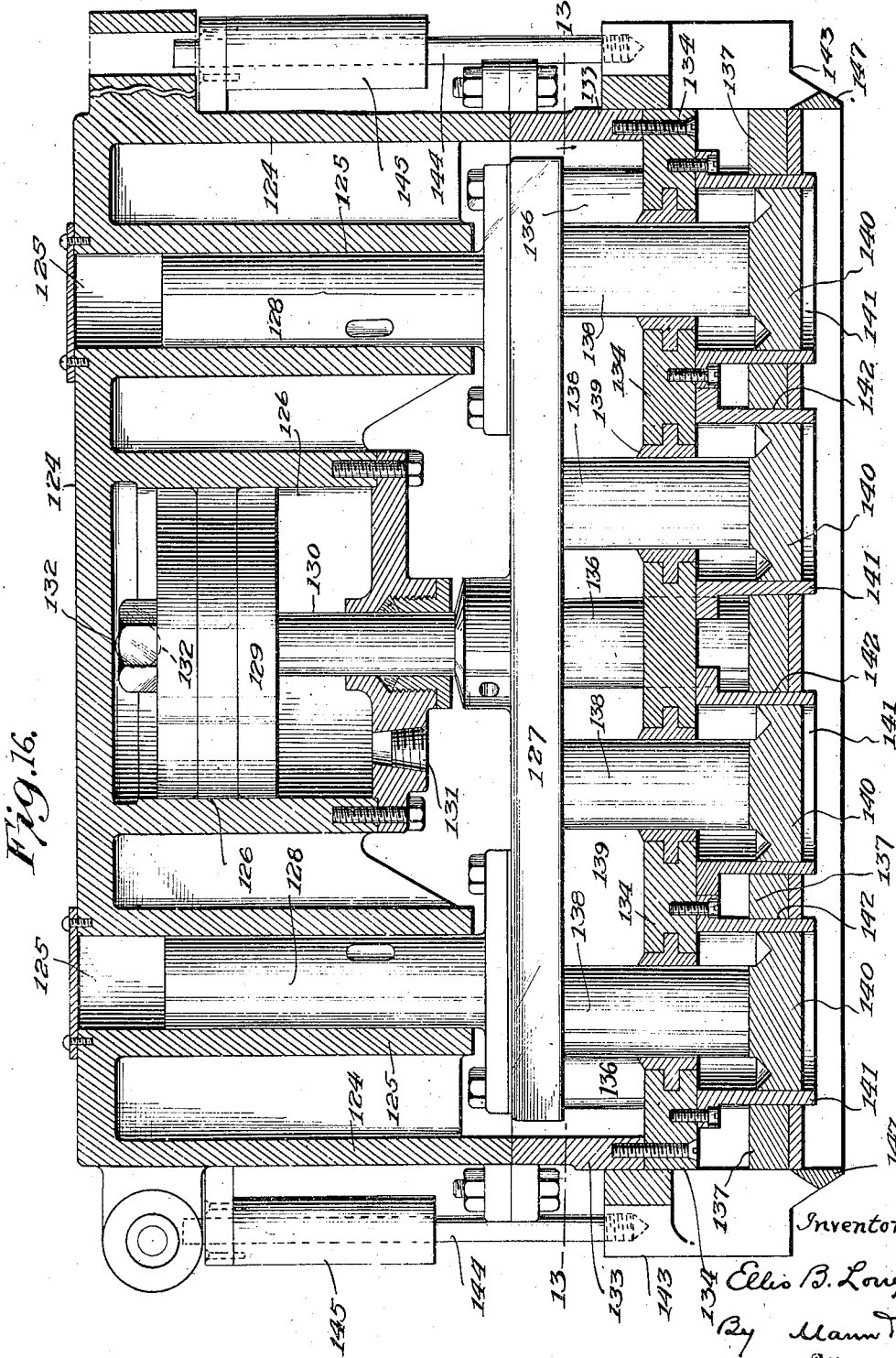

Jan. 6, 1925.                    E. B. LONG                    1,522,135
                              MOLDING MACHINE
                          Filed June 4, 1920         16 Sheets-Sheet 10
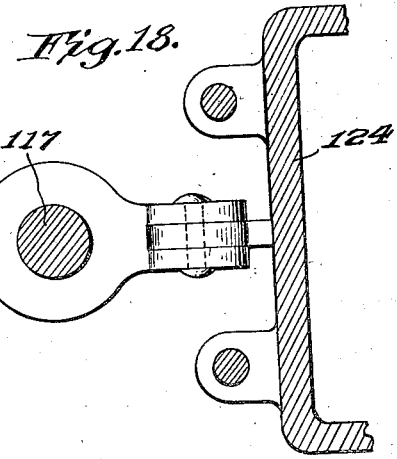
Fig. 18.
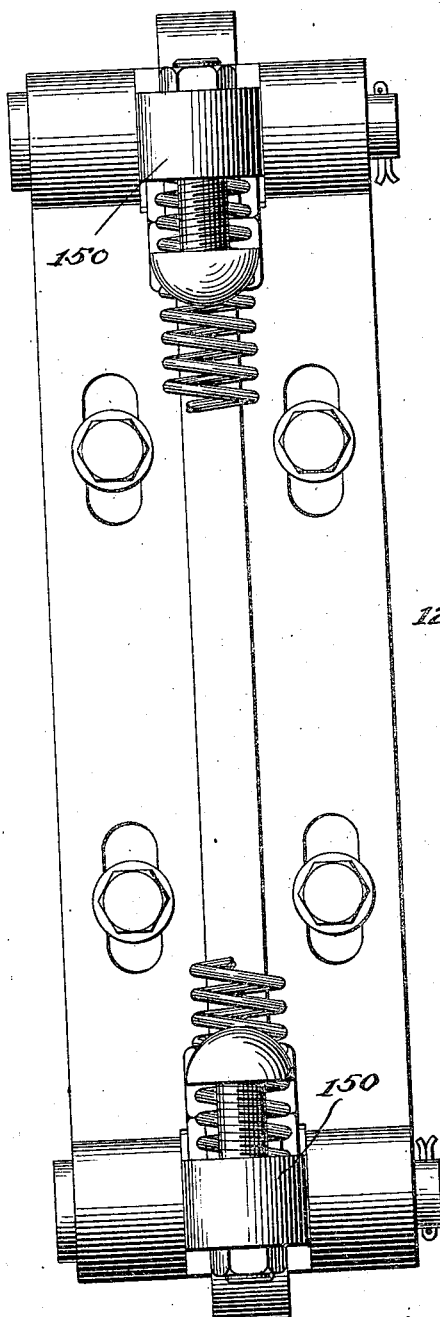
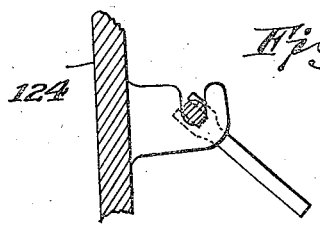
Fig. 20.
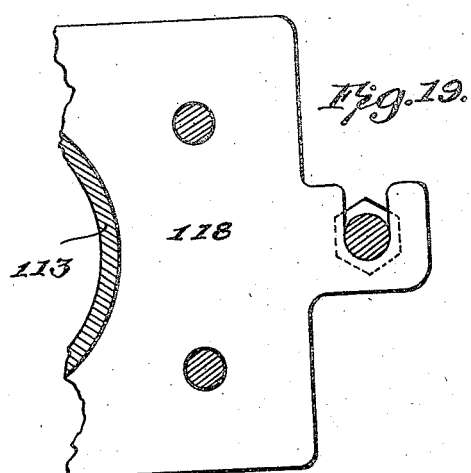
Fig. 19.
Fig. 17.
Inventor
Ellis B. Long
By Mann & Co.
Attorneys.

Jan. 6, 1925.  1,522,135
E. B. LONG
MOLDING MACHINE
Filed June 4, 1920  16 Sheets-Sheet 11

Inventor
Ellis B. Long
By
Mann & Co.
Attorneys

Jan. 6, 1925.  
E. B. LONG  
1,522,135  
MOLDING MACHINE  
Filed June 4, 1920  
16 Sheets-Sheet 12
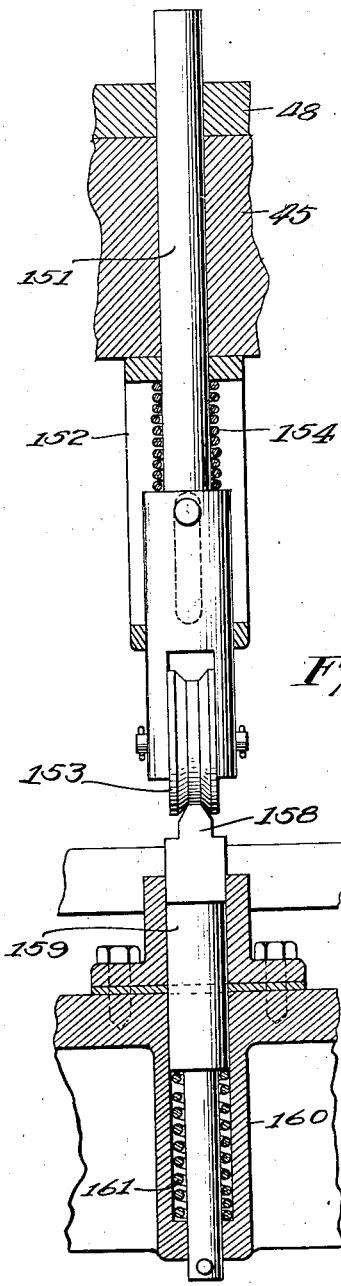
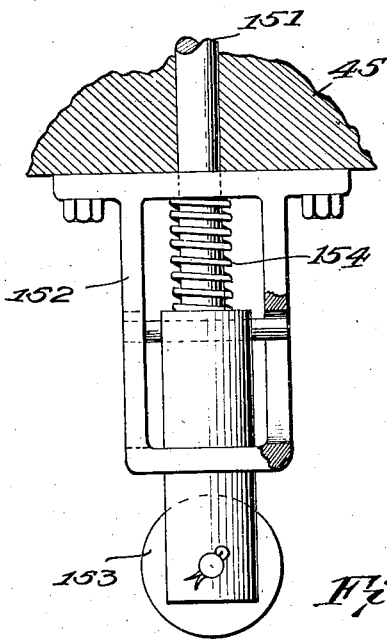
Inventor  
Ellis B. Long  
By  
Mann & Co.  
Attorneys.

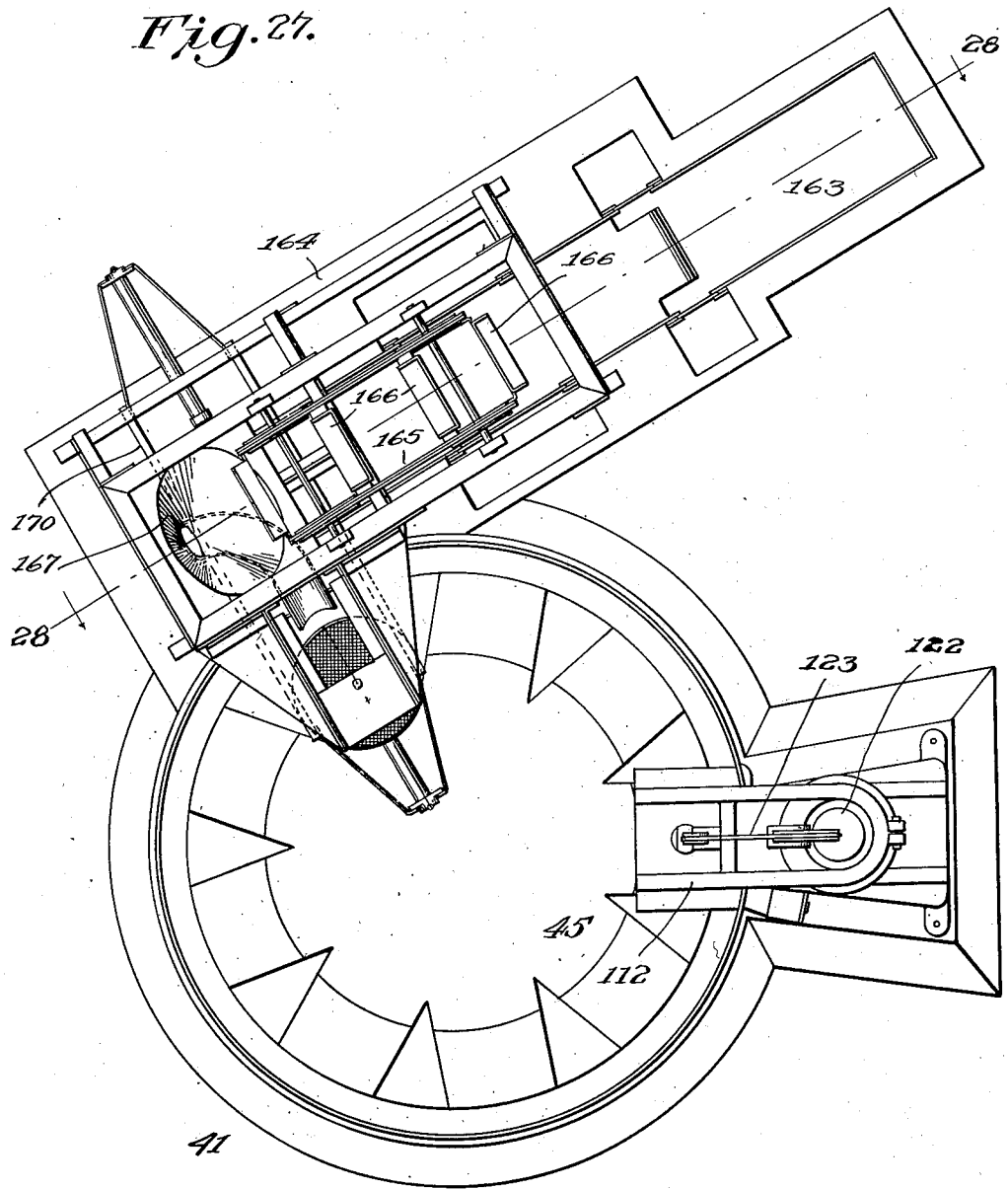

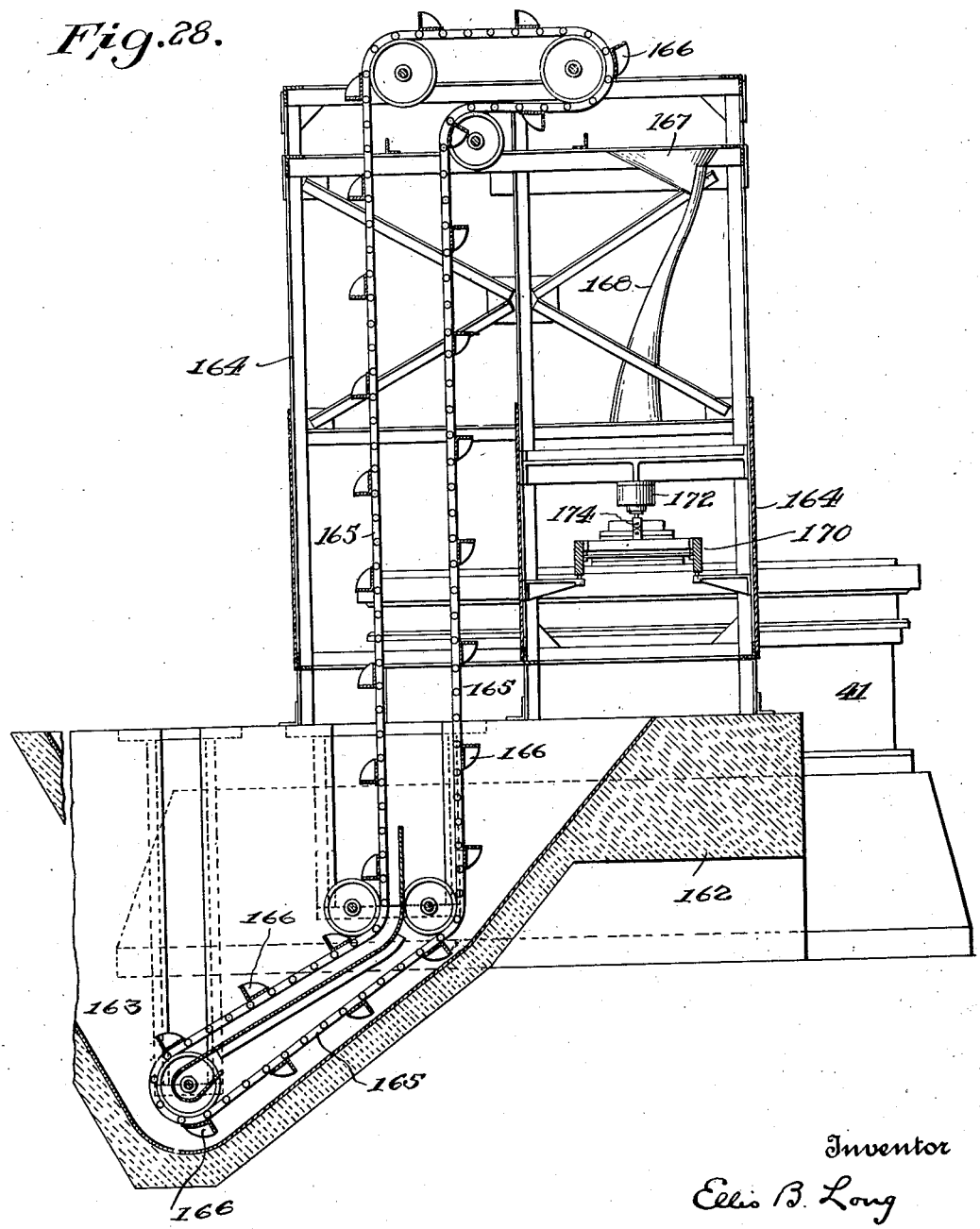

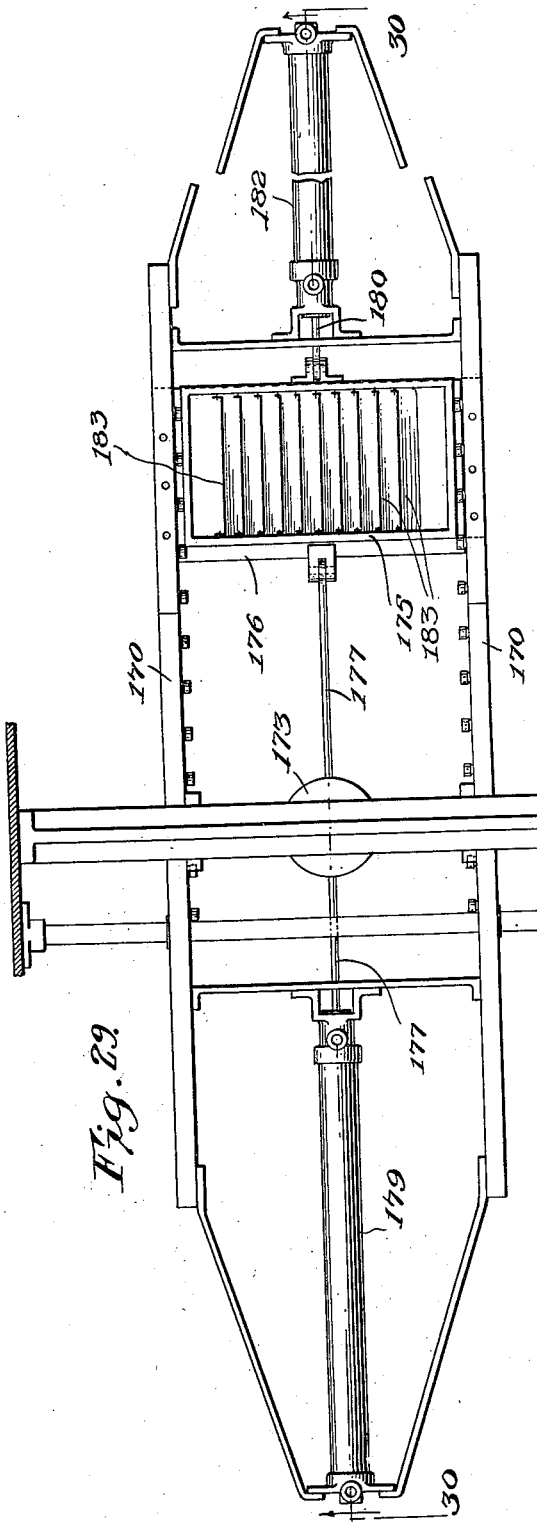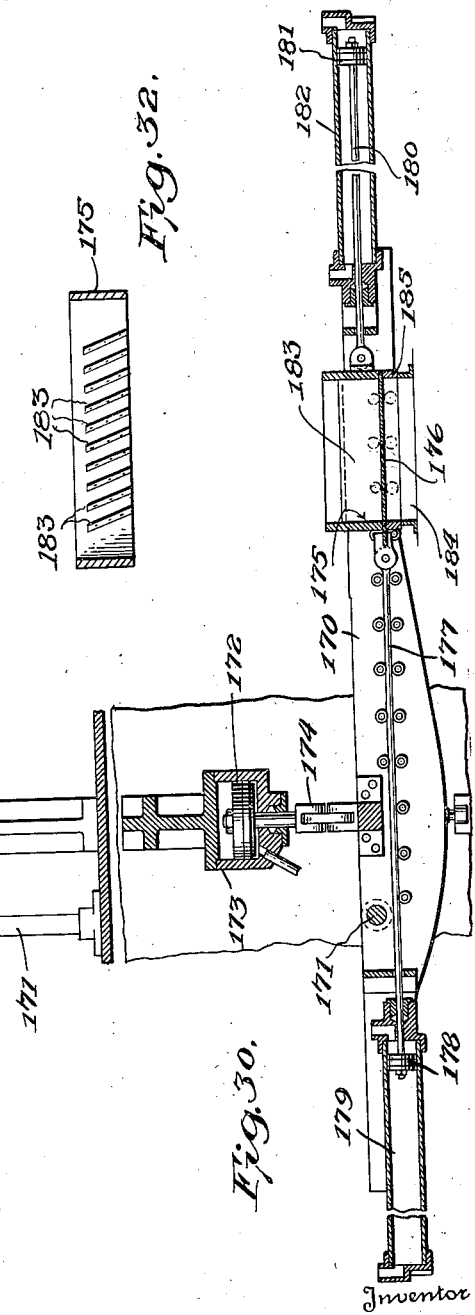

Jan. 6, 1925.

E. B. LONG

MOLDING MACHINE

Filed June 4, 1920 16 Sheets-Sheet 16

1,522,135

Inventor
Ellis B. Long
By Mann & Co.
Attorneys.

Patented Jan. 6, 1925.

1,522,135

UNITED STATES PATENT OFFICE.

ELLIS B. LONG, OF BALTIMORE, MARYLAND, ASSIGNOR TO THE BARTLETT HAYWARD COMPANY, OF BALTIMORE, MARYLAND, A CORPORATION OF MARYLAND.

MOLDING MACHINE.

Application filed June 4, 1920. Serial No. 386,573.

*To all whom it may concern:*

Be it known that ELLIS B. LONG, a citizen of the United States, residing at Baltimore, in the State of Maryland, has invented certain new and useful Improvements in Molding Machines, of which the following is a specification.

This invention relates to improvements in automatic molding machines and has for its object to provide an improved machine for presenting flasks in succession to a sand-receiving mechanism and an impression mechanism whereby to rapidly produce sand-molds for use in producing metal castings in considerable quantities.

The invention resides in various mechanisms and combinations of mechanisms embodied in the machine as will hereinafter be set forth and more particularly recited in the claims forming part of the specification.

It is to be understood however that the accompanying drawings illustrating the invention are intended merely to disclose one practical embodiment of the invention and are not to be taken as defining the scope of the invention.

In said drawings,—

Fig. 1 shows a side view of a machine embodying the invention.

Fig. 2 illustrates an enlarged front elevation of the press carrying the patterns.

Figure 8:
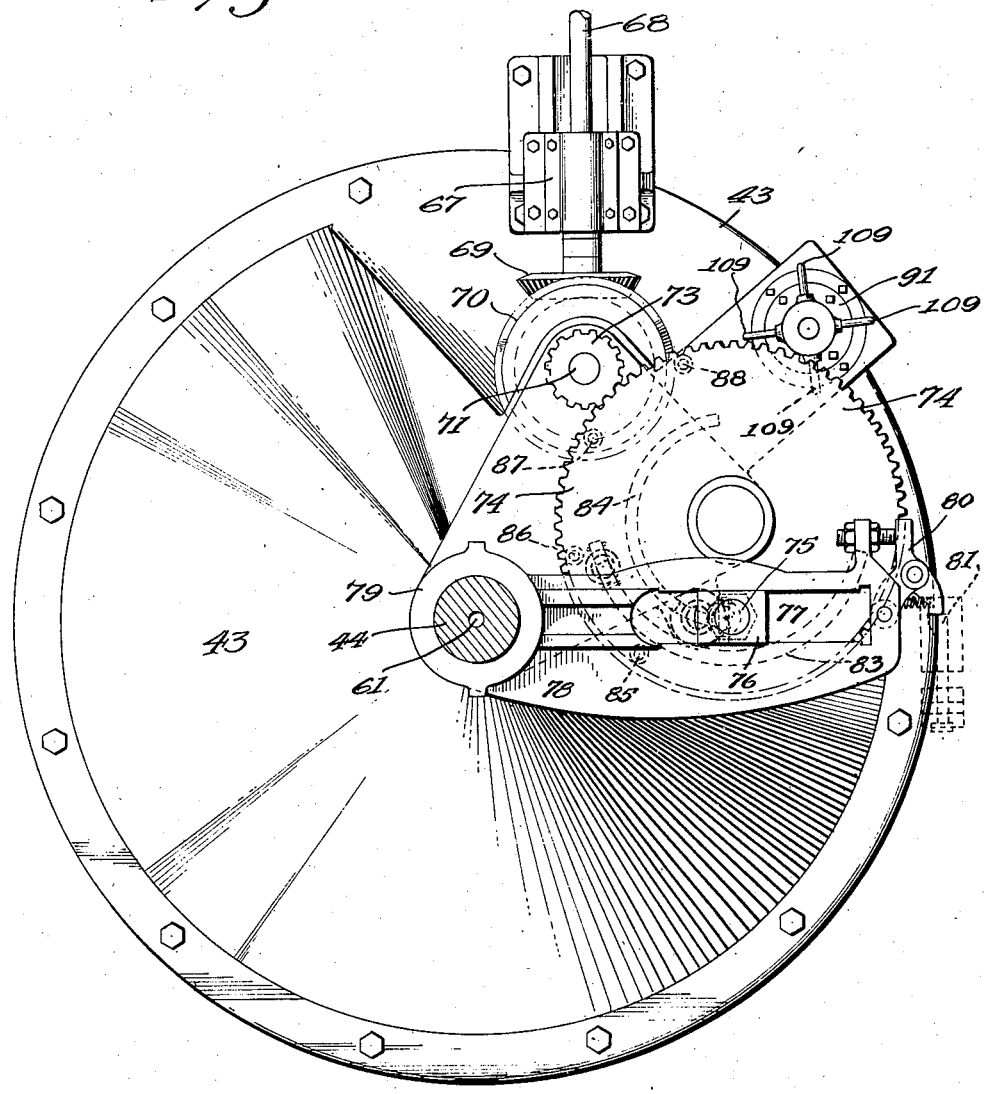

Figs. 3 and 3ª show the machine in top or plan view.

Figs. 4 and 4ª illustrate enlarged vertical sectional details through the machine,—the sections being taken on the lines 4 and 4ª of Figs. 3 and 3ª of the drawing.

Fig. 5 shows a sectional plan view of the pattern-cleaning valve, partly in top view and part in section.

Fig. 6 illustrates a horizontal sectional detail through the centralizing cylinder.

Fig. 7 a vertical section through the same,—the section being taken on the line 7—7 of Fig. 3.

Fig. 8 shows in plan, the central supporting base and the driving mechanism for moving the table and functioning the valves—all as the same would appear if viewed on the line 8—8 of Fig. 4ª.

Figure 9:
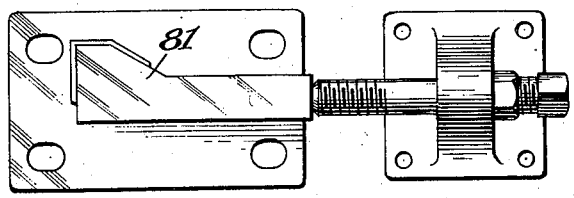

Fig. 9 illustrates an enlarged top view of one of the several blocks on the table by which the latter is intermittently moved.

Fig. 10 is a plan view of the table-bearing under the press as the same would appear on the line 10—10 of Fig. 4.

Fig. 11 is a sectional elevation on line 11—11 of Fig. 10 and shows the movable gate-rod track-sections under the press.

Fig. 12 shows in a diagrammatic way, the cam-track for actuating the gate-rods.

Fig. 13 shows a horizontal cross-section through the lower half of the pattern box, the section being taken on the line 13—13 of Fig. 1 of the drawings.

Fig. 14 illustrates a vertical sectional detail through the same,—the section being taken on the line 14—14 of Fig. 13.

Fig. 15 shows another sectional detail through the box as the same would appear if cut on the line 15—15 of Fig. 2.

Fig. 16 illustrates an enlarged vertical sectional view through the complete box.

Fig. 17 shows a front elevation of the valve operating means as the same would appear if viewed on the line 17—17 of Fig. 4.

Fig. 18 illustrates a cross-sectional detail through the box-hinge,—the section being taken on the line 18—18 of Fig. 2.

Fig. 19 shows a detail in plan of the box-locking device as the same would appear if viewed on the line 19—19 of Fig. 2.

Fig. 20 is a detail of the same as viewed on line 20—20 of Fig. 2.

Figure 21:
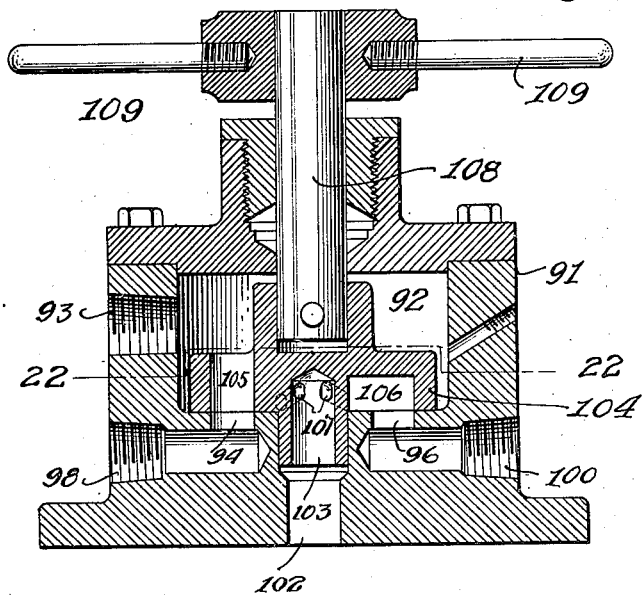

Fig. 21 is a vertical sectional detail through the valve mechanism that controls the hopper,—the section being taken on the line 21—21 of Fig. 4ª.

Figure 22:
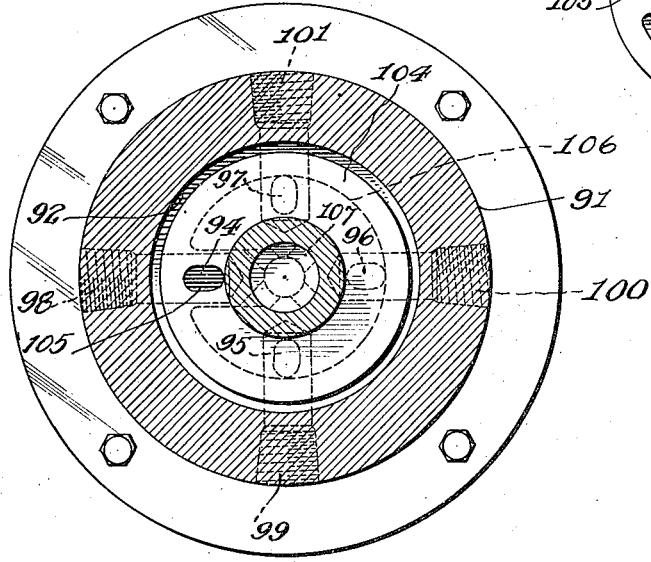

Fig. 22 is a horizontal sectional detail through the same,—the section being taken on the line 22—22 of Fig. 21.

Figure 23:
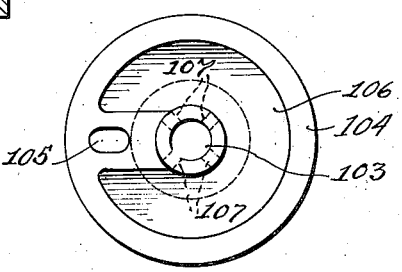

Fig. 23 shows a plan view of the detached head of the hopper-control valve.

Fig. 24 is vertical sectional detail showing the gate-rod and collapsible track means to operate the same all of which are located below the press.

Fig. 25 is a side view of the gate-rod bearing and roller.

Fig. 26 shows the collapsible track-section and bearing therefor in plan view.

Fig. 27 shows a top view of the complete machine including the sand elevating mechanism, hopper and the operating mechanism of the latter.

Fig. 28 a sectional elevation of the same,—the section being taken on the line 28—28 of Fig. 27.

Fig. 29 shows the hopper mechanism in plan view.

Fig. 30 illustrates a longitudinal section through the same on the line 30—30 of Fig. 29.

Figure 31:
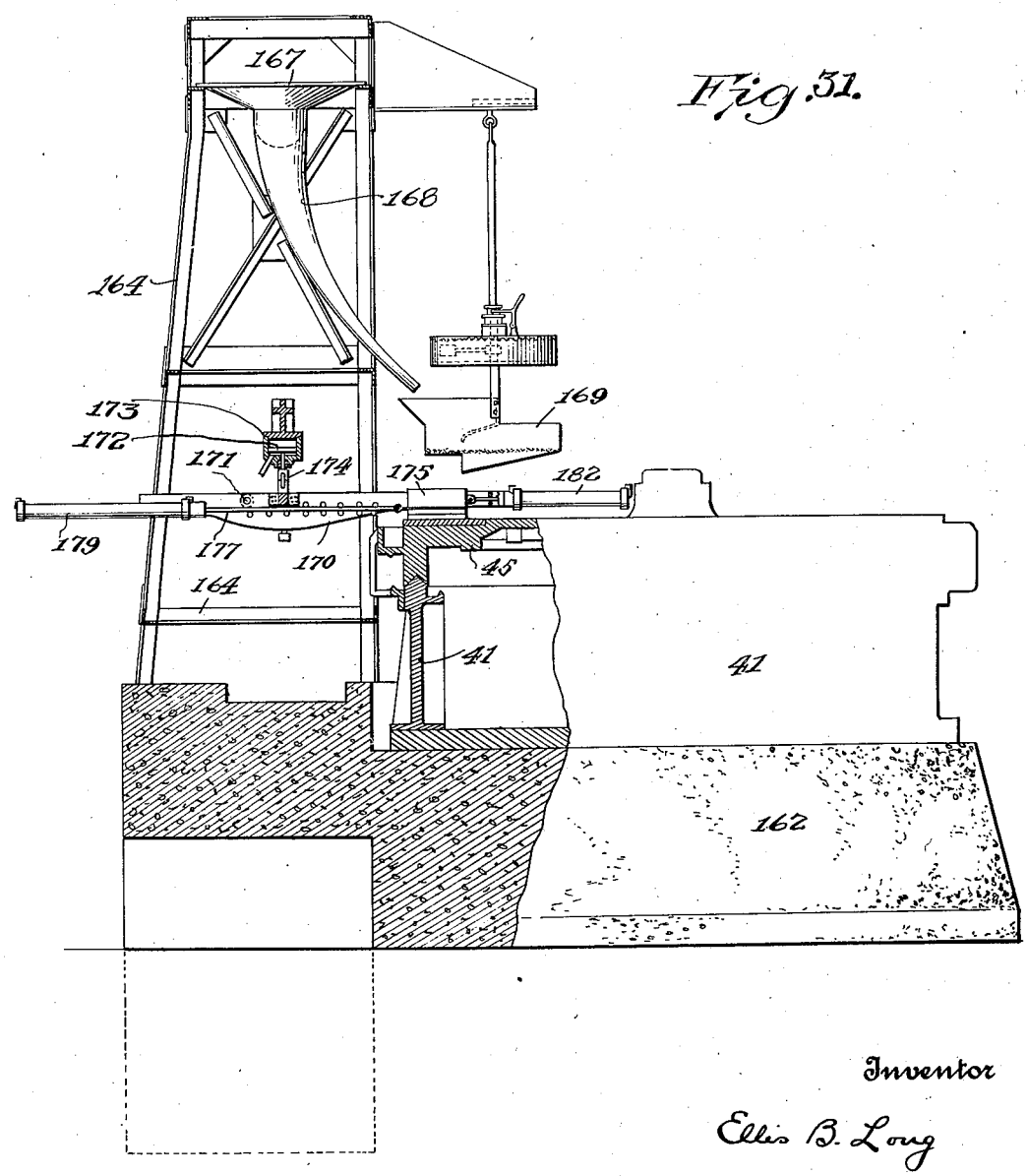

Fig. 31 shows a sectional elevation of the mechanism shown in Fig. 28 and

Fig. 32 illustrates a cross-sectional detail through the hopper to show the inclined shutters or partitions therein.

Referring to the drawings, and particularly Figs. 1—3—3ª 4 and 4ª thereof the numeral 40, designates a circular base which sustains an annular wall 41 whose upper edge is formed to provide a beveled endless bearing-face 42.

On the interior of the annular wall, and also supported on the base is a central base 43, which latter sustains a vertical post or shaft 44 which is centrally disposed with respect to the annular wall.

A circular table 45, is centrally mounted on the post 44, and at its circumference this table is provided with a depending annular flange 46, whose lower edge has a beveled groove to engage the beveled bearing-face 42, on the lower annular wall. By this means the table is sustained in a horizontal plane and may be rotated about the central post or shaft while it is circumferentially supported by the bearing face 42.

The under side of the table 45, is provided with an annular bearing surface 47, as shown in Figs. 4 and 4ª of the drawing, which serves a useful purpose as will presently be explained.

The upper side of the table is provided with a series of flask-supporting plates 48, which are rigidly secured on the table and move with the latter. These plates are arranged in an endless circular series, as best illustrated in Figs. 3 and 3ª of the drawing, and in practice I preferably provide a slight space between adjacent plates which spaces are formed with radially-inclined troughs 49, which, by preference, have their lower ends terminating at the periphery of the table, as shown in Figs. 3, 3ª and 4ª of the drawing. These radial troughs between the plates are utilized to discharge the surplus sand from the table surface as and by means that will presently be more fully explained.

An annular circumferential ledge 50, with an outer retaining wall 51 is provided around the flange 46, of the table to catch the sand and convey it around to a discharge-scraper 52, which latter directs the sand laterally from the ledge,—the scraper being illustrated in Fig. 3ª of the drawing.

By reference to Figs. 1—3, 3ª, 4 and 4ª, it will also be noted that the under side of the ledge 50, is provided with a series of V-shaped cam-faces or ribs 53,—there being one face or rib for each flask-supporting plate, and the ends of one rib being slightly separated from the ends of the next adjacent face or rib.

An air-blast valve device 54, is attached to the retaining wall 51, and has an actuating arm 55, which is operated by the successive faces or ribs 53 on the bottom of ledge 50 during the movement of the table, whereby to direct a blast of air through a pipe 56, that projects over the table, but points toward the circumference of the latter, whereby to blow sand from the table surface and keep the latter clean. To prevent this blown sand from passing over the top of wall 51, I provide, in the present instance, a shield 57, which directs the blown sand downwardly onto the ledge 50. When the table is at rest, the actuating arm 55, of the blast-valve 54, will have position in the space between adjacent faces or ribs 53, so that said arm may move upwardly and cut off the air while the table is at rest.

By reference to Figs. 3—3ª, 4ª and 5 of the drawings, it will be noted that the table 45, is provided with a series of radially-extending air-pipes 58, whose outer ends 59, are perforated and terminate in the troughs 49, whereby to direct a blast of air in said troughs against patterns to clean same as they pass, and blow the sand therefrom. The inner ends of these pipes 58, communicate with upwardly-inclined passages 60, one of which is shown in Fig. 4ª, and these passages open upwardly at a horizontal flat face at the center of the table and are disposed circularly about the upper end of the central post 44.

The post 44, is provided with a central air-supply passage 61, which is constantly supplied with air from a pipe 62, see Fig. 4ª, and the upper end of the post is covered by a cap 63, which forms an air-chamber 64, with which the passage 61 constantly communicates so that the chamber is constantly supplied with air under pressure.

It will be understood that the post 44, is stationary while the table 45, with its pipes 58 and passages 60, revolves so that the upwardly-open ends of the passages 60 travel about the post.

A ring 65, is secured to the upper end of the post 44, and is therefore stationary, and the under face of this ring seats close on top of the flat face of the table and covers the circular series of passage-ends 60 so that the air in said chamber 64, cannot enter any of said passages except as will now be explained.

A port 66, see Figs. 4ª and 5 of the drawing, extends vertically through the ring and has position in a vertical plane where the series of passage-ends 60, may successively and intermittently communicate therewith as the table is rotated. By this means, when one of the passage-ends 60, comes into register with the port 66 of the ring, air will pass through the port into such registering passage and be conducted by the pipe 58, from that passage to the periphery of the table where such air is liberated to blow from the pattern any sand that may have adhered to it.

Under the present practice of operation, the table 45, is given an intermittent or step-by-step movement, so that while the table is at rest certain of the operations may be better effected.

The means employed to impart this intermittent movement will therefore now be explained, reference being made particularly to Figs. 4ª, 8 and 9 of the drawings.

The central base support 43, sustains a bearing 67, through which a constantly revolving main driving-shaft 68, extends. The inner end of this shaft carries a bevel-pinion 69, which meshes with and drives a beveled-gear 70, on the lower end of a vertical shaft 71. This vertical shaft extends up through a vertical bearing 72, on the upper side of the central base, as can be seen in Fig. 4ª, of the drawing, and the upper end of said vertical shaft carries a pinion 73, which revolves in a horizontal plane.

A large gear 74, is suitably sustained in a horizontal plane above the base whereby it may mesh with and be driven by the pinion 73, so that said gear may be continuously revolved although its revolution, in practice is slow. This large gear 74, is provided with a pin 75, that projects upwardly therefrom, similar to a crank-pin, and this pin carries a block 76, that enters and has sliding movement in a slot 77, of a horizontal arm 78.

The arm 78, has a tubular bearing sleeve 79 at one end thereof which slips down on the post 44, whereby said arm and sleeve may be oscillated or rocked back and forth as the crank pin 75 on the gear 74 makes a circuit with the same.

The outer end of arm 78, carries a pawl 80, which, as the free end of said arm is moved in one direction, rides past cam-lugs 81, that are carried on the under side of the table and when said arm is moved on its return sweep this pawl engages one of said lugs and moves the table one step forward.

By reference to Figs. 3 and 3ª of the drawing it will be seen that the cam-lugs 81, are indicated by broken lines and that there are as many lugs as there are flask-supporting plates or stations 48.

From the foregoing explanation it is to be understood that during each revolution of the large gear 74, the arm 78, is swung on post 44, first in a direction reverse to that in which the table is moved and then returned moving the table with it, so that the cam-lugs 81 are engaged successively and the table moved one step on each complete revolution of the large gear 74.

The depending flange 46, at the circumference of the table is provided on its outer vertical face with a series of slotted locking-plates 82,—there being one such plate for each flask-station or plate 48, which the table carries, but it is to be understood that the locking plates are not on the flask-plates but on the table flange 46, as indicated in Figs. 6 and 7 of the drawing.

The purpose of the locking-plates 82, is to provide means for rigidly locking the table against rotary displacement so that the same may be positively held during the operation of presenting the pattern to the sand in the flask while the latter is held in place on the plates 48, under the pressing station, as will presently be more fully explained.

By again referring to Figs. 8 and 9 of the drawing it will be noted that the large gear 74, is provided on its under side with a cam-track 83 and a second cam-track 84 and that it is further provided with a plurality of spaced depending rollers or lugs 85, 86, 87 and 88, respectively. These cam-tracks and rollers or lugs are provided to effect operations of certain air-control valves whereby certain operations, hereinafter to be explained, are to be performed in proper sequence and time.

It will therefore be understood that the large gear 74, in the present embodiment of the invention, has several functions to perform in addition to that of imparting a step-by-step movement to the table, because each cam-track controls a different air-valve.

Beneath the cam 83, the base 43, carries an air-valve 89, which latter has a roller that engages the track, and when in such engagement, opens the valve to permit fluid pressure to pass to a hopper and knife mechanism, as will presently be explained.

Another air-valve 90, is carried by the base 43, beneath the cam-track 84 and this valve also has a roller that is actuated by the cam-track above it to open said latter valve 90, and permit fluid-pressure to pass to a press operating mechanism, also for a purpose presently to be set forth.

In addition to the valves 89 and 90 there is also provided what I term a four way valve 91, which latter is illustrated in Figs. 4ª, 8, 21, 22 and 23, of the drawings to which reference will now be briefly made.

This four way valve 91, comprises casing with a circular chamber 92, therein which casing has an inlet port 93, for the inlet of fluid-pressure such as compressed air.

The bottom of the chamber 92, is provided, in this instance, with four uniformly-spaced ports 94, 95, 96 and 97, respectively which latter open into or communicate with lateral passages and pipes 98, 99, 100 and 101.

The base of the casing is provided with a central exhaust port 102, in the upper end of which a hollow plug 103, on the lower side of a disk-valve 104, projects downwardly. This disk-valve 104, has a single vertical inlet-port 105, and in its under side is provided with a segmental cavity 106. The depending plug 103, of this disk-valve is provided with a vertical passage into whose upper end there open a plurality of lateral ports or passages 107, which ports or passages have their other ends opening into the segmental chamber 106 of the disk-valve.

A vertical stem 108, has its lower end rigidly secured to the disk-valve 104, and the upper end of this stem projects through the cover and a stuffing box on the valve casing to the upper side of the latter where a plurality of radial arms 109, are provided on the stem, as clearly illustrated in Figs. 8 and 21, of the drawing.

By reference to Figs. 4ª and 8, of the drawing, it will be noted that the radial arms 109 of the four-way valve extend laterally in a horizontal plane so as to project in the path of the rollers or lugs on the bottom of the large gear 74 so that as the gear revolves the several rollers 85, 86, 87 and 88, on said gear may successively engage the radial arms on the valve and impart a partial rotation to said valve as each roller and arm are in contact. The relation of the rollers and arms is such that during a portion of each revolution of the gear 74, the four-way valve will be given a complete revolution thereby successively establishing communication between the air-supply in chamber 92, and the ports 94, 95, 96 and 97 as the port 105 of the disk-valve 104, passes over the same. During this intermittent rotation of the disk-valve exhaust connections will be maintained from all the pipes and passages, 98, 99, 100 and 101, except that one of said passages which is at the moment in communication with the supply port 105, through the ports 107, to passage 102 which latter opens to the atmosphere.

From the foregoing explanation it will be noted that the gear 74, carries all the elements, cams 83 and 84 and rollers 85, 86, 87 and 88 which are to control the main elements of the machine.

In carrying out my invention I combine with the intermittently rotating table, a press structure, beneath which the sand-filled flasks are halted for a sufficient time-period to permit the pattern impression to be made in the sand.

This press structure will now be described, reference being made particularly to Figs. 1—2—4 and 4ª of the drawings.

A suitably-designed base 110, is located at the side of the annular wall of the table support and on top of this base there is mounted a column 111, which carries a laterally-projecting bracket 112, that extends over but is located some distance above the top surface of the table 45.

A cylinder 113, has its upper end rigidly secured to the under side of the bracket 112 and said cylinder depends toward but has its lower end spaced above and directly over the circular path through which the flask-supporting plates 48, on the table are caused to travel.

The upper end of said cylinder 113, has its walls so shaped as to provide a central vertical cross-slot 114, as shown in Figs. 2 and 4 of the drawing, so that a cross-bar 115, may extend horizontally through said slot and have its ends projected at diametrically-opposite sides of the cylinder.

The opposite sides of the cylinder are also provided with laterally-projecting webs which carry vertically-disposed guide tubes 116, so that vertical tie rods 117, may depend from the projecting ends of the cross-bar 115; pass down through the tubes 116, and have their lower ends connected to a flange plate 118, that projects horizontally from a piston 119.

The piston 119, fits up into the cylinder 113, as shown in Fig. 4, and its upper end is notched at 120, to permit it to straddle the cylinder walls that form the central slot 114.

An air-supply pipe 121, enters the cylinder above the piston for the purpose of providing a driving force to operate the piston.

The piston 119, carries a box in which the impression mechanism is located and to substantially counter-balance the weight of the piston and its associated devices, I provide a counter-balance weight 122, which is located in the column 111, and from which a cable 123, passes over suitable guide rollers and is connected with the cross-bar 115. As this cross-bar is connected to the piston 119, through the rods 117 and flange 118, it follows that the weights 122, have a counter-balancing effect on the said piston and the parts carried by the latter.

To the lower end of the piston 118, there is rigidly attached a head or box which latter, in the present instance, is of a rectangular form or shape and carries the pattern and stripper devices that are to produce the impression in the sand. These devices, together with the piston and cylinder, form a press and are socalled when referred to collectively.

The box and its associated parts will now be described, reference being made particularly to Figs 1—2—4—13—14—15 and 16 of the drawings.

The box 124, has depending side and end walls and on its interior is provided with a plurality of guide tubes 125, and a cylinder 126. Beneath the tubes and cylinder there is provided a horizontal spider-plate 127, from the upper side of which there project vertical stems 128, which enter said guide-tubes 125.

A piston 129, is located in the cylinder 126, and said piston has a stem 130, whose lower end is connected to the spider-plate so that whenever the piston moves up or down, the spider-plate will be given a corresponding movement and will be guided during such movement by the stems 128, and tubes 125. Suitable ports 131, and 132, are provided in the cylinder, at opposite sides of the piston 129, for the passage of fluid pressure as will hereinafter be explained.

A lower box member 133, is utilized for convenience in construction and maintenance, and this member carries a lower horizontal bearing plate 134, that is provided with a series of vertical bearing passages containing bearing sleeves 135. Through these bearing-sleeves there extend a plurality of stems 136, whose upper ends are rigidly secured to and depend from the spider plate 127, and whose lower ends are rigidly connected to and sustain a horizontal stripper-plate 137.

The spider-plate 127 is also provided with a plurality of depending stems 138, which pass through bearing-sleeves 139, in the bearing-plate 134 and whose lower ends carry a head 140, which in this instance is of circular form. The shape of these heads is determined by the shape of the pattern that is to be made in the sand, and as this particular machine is shaped and designed to produce piston-rings, the heads 140, have a circular form.

Around each head 140 there is provided a pattern 141, which, in this instance, is of a cylindrical form, and each pattern passes through an opening 142, in the stripper-plate 137 that is shaped to snugly fit it. At the upper side of the said pattern-plate 137, each pattern is securely and rigidly fastened to the under side of the bearing-plate 134.

From the foregoing explanation it is to be understood that the patterns 141, are carried by the bearing plate, 134, and that the bearing-plate is attached to and moves vertically with the lower and upper box members 133 and 124,—so that the patterns also move with the box. The stripper-plate 137 and heads 140, however, are connected to and move with the spider plate 127, and piston 129, but are also movable in conjunction with the box 124, when the press makes its downward movement toward the sand in the flask.

A retaining sleeve or frame 143, extends all the way about the lower box-member 133 and is pendantly-sustained thereabout by means of vertical rods 144, whose upper ends pass through friction cylinders 145, and project slightly above the upper ends of the latter. The upper ends of these vertical rods 144, have position directly under and in alinement with the lower ends of rigid resetting rods 146, that depend from webs that are carried by the stationary cylinder 113, as best illustrated in Fig. 2 of the drawing, so that when the piston 119 and box move upwardly, the upper ends of the rods 144, will engage the lower depending ends of the stationary rods, before the complete up-stroke of the piston is made, and thereby hold the rods, 144, and the retaining sleeve 143, at the lower end thereof stationarily while the box parts and piston continue on upwardly. Thus it will be understood that the retaining frame or sleeve 143, has a telescopic movement with respect to the lower box part 133.

When the piston makes a downward stroke toward the sand-filled flask on the table, the lower end 147, of the retaining frame or sleeve first cuts through the sand and comes into registration with the rectangular boundary walls of the flask. This lower edge 147, therefore forms a retaining boundary wall for the sand to prevent lateral displacement of such sand, as patterns 141, begin and continue their entry into the sand. As further downward movement of the press, box and patterns is made, the retaining sleeve, having been previously seated on the flask, will remain stationary while the lower box-member 133, slides down therein. During this telescoping movement, the cylinders 145, with packing material therein, frictionally slide down on the rods 144. After the piston 119, has completed its stroke and carried the box-parts down, embedding the patterns in the sand, the supplemental piston 129, will move down carrying the spider plate 127 stems 138, and heads 140, whereby the sand will be compressed and packed closely about the patterns and make a clean-cut and sharp impression in the sand. The piston then elevates the box, and the sleeve and patterns begin withdrawal from the sand, momentarily leaving the stripper-plate 137 and heads 140, stationary. Then the stripper-plate and heads are withdrawn from over the flask. It is during the completion of this upward stroke that the rods 144, are engaged and held stationarily while the box makes a sufficiently further upward movement to withdraw from the retaining sleeve or frame.

By reference to Fig. 4 of the drawing, it will be noted that a valve casing 148, is carried at one side of the box 124, and that said casing carries a valve structure having heads 149 at its upper and lower ends. This valve structure controls the inlet of fluid pressure to and the exhaust of pressure from the opposite sides of the stripper box piston 129, and movement of the valve is effected as the box is making its downward and upward strokes by reason of the heads 149, contacting with actuating levers 150, at the upper and lower ends of the valve casing. The particular construction of this valve device is immaterial and a detailed illustration of it is purposely omitted so as to avoid multiplicity of detail drawings.

The table 45, and the flask-supporting plates 48, are provided with vertical passages through which gate-rods 151, project from beneath the table. These rods, as best shown in Figs. 4 and 24 of the drawings, have their lower ends guided by brackets 152, that are carried on and depend from the under side of the table, and the lower end of each rod carries a roller 153. The rods are actuated in a downward direction by springs 154, and when down, their upper ends are substantially flush with the top surface of the flask-supporting plate but when up, said upper ends will project far enough above the plates 48, to extend through the depth of sand in the flask on the supporting plate whereby to form a hole or holes through the sand through which the fluid metal may be poured. Mechanism is employed to move the gate rods 151 as will presently be explained.

Beneath the press station I provide an extra support 155, for the table whereby to enable the table to be rigidly supported when the press descends, and this support has a curved plate or block 156, with a tenon on the bottom that engages a mortise in the support, while the upper face of the block forms a supporting for the bearing surface 47, on the under side of the table, as best shown in Fig. 4 of the drawing.

It is to be understood that the gate rods 151, travel with the table and that during the circuit, the rods are moved upwardly to form the holes in the sand and are then retracted after leaving the pressing station and before the flasks are removed. To effect this vertical movement of the gate-rods I provide a cam-track 157 beneath the table onto which the rollers 153 of the rods ride as they advance toward the press-station, so that as the rollers are successively elevated, the rods 151, will be correspondingly elevated against the action of the springs 154. The cam track is depressed at the point where it is desired to retract or lower the rods,—the two ends of the track being shown in the small scale detail of Fig. 12.

I have found in practice that it is desirable to provide some means for yieldingly holding the rods up while the latter are at the pressing station so as to allow the same to yield vertically when the press comes down.

To effect this I provide yielding track sections 158, on which the rollers 153 rest during the pressing operation.

These yielding track sections are sustained by plungers 159 that are guided in depending bearings 160, and springs 161, of greater force than the springs 154 on the gate rods 151, are utilized to hold the yielding track-section up in place. Should undue pressure be brought on the upper ends of the gate rods the latter may yield by compressing the springs 161, and forcing the yielding track-sections down.

In carrying out the automatic operations of the machine I have provided means for delivering sand to the flasks on the table in a way as to prevent such sand from being packed or dense in the flask when the pattern first enters the latter.

This portion of the invention is illustrated in Figs. 27 to 31 of the drawings to which reference will now be made.

The base 41, of the machine structure hereinbefore described is preferably mounted on a suitable foundation 162 in which latter and at the side of the machine proper I provide a pit 163. Over the pit and at the side of the table I provide a suitable fabricated iron structure 164, which sustains an endless conveyer 165, on which an endless series of buckets 166 are arranged, as best shown in Fig. 28. These buckets travel down into the pit 163, to scoop up a charge of sand and then elevate the same to the top of the structure 164, where the sand is discharged into a hopper 167 and directed by a pipe 168, down to a shaking screen 169.

Beneath the shaking screen I provide a horizontal frame 170, which latter extends over the top of the table 45, and this frame is pivotally mounted on a cross-rod 171, so that the end which extends over the table may be raised or lowered. This vertical rocking of the frame 170, to raise and lower the latter, is effected through the movement of a piston 172, in a cylinder 173 that is located over the frame,—a link or equivalent structure 174, being provided to couple the frame and piston.

Piston 172, is controlled by piston-valve 89 and cam 83, on the bottom of gear 74 so that while cam 83 is traveling past the valve 89, the frame 170, will be elevated so that the hopper 175, will be lifted above the table while the latter is making an intermittent movement from one flask-station to another.

The forward end of the frame 170, carries a hopper 175 in which there is a slide-valve or gate 176, and the valve or gate is located in the bottom of the hopper and performs a very useful function as will presently be explained.

The slide valve or gate is connected by a rod 177 to a piston 178 in cylinder 179, as best illustrated in Fig. 30 of the drawing so that the slide valve may be operated through the movement of piston 178.

The hopper 175, is provided with a series of inclined shutters or partitions 183, the lower ends of which latter terminate above the slide-valve 176, as shown in the sectional detail of the hopper that is illustrated in Fig. 32 of the drawings. These shutters or partitions 183, receive the sand that is sifted thereon from the shaking screen 169 overhead so that said shutters or partitions serve to break the fall and drop the sand only a few inches into the flask 184 beneath. This fall of the sand is so slight that the sand when deposited in the flask is left in a fluffy snowed or light condition instead of being dense and packed, as it would be, if its fall was from the shaking screen into the flask.

Beneath the slide valve or gate 176 and attached to the side rails of the frame 170, is what I term a squeeze-ring or frame 185. This ring or frame lifts and moves with the frame 170, and when the latter is in position for the flask-sanding operation the ring or frame 185, seats down on the upper edge of the flask so as to provide an additional or supplemental wall between the top edge of the flask and the under side of the slide-valve or gate 176.

This additional or supplemental chamber is desirable because the sand is snowed and lays in the fluffy state and for this reason the normal height of the sand must be greater than the height of the flask-wall prior to the entry of the pattern into the sand because immediately after this entry takes place the sand will be compressed about the pattern and during this operation all the sand beneath the gate is packed into the flask about the pattern.

The gate valve 176, obviously is open when the sand is fed to the squeeze ring 185, and flask 184, and in order to leave this sand of a uniform depth, the gate valve 176, will be moved forward like a knife and during this movement cuts the sand from the top of the pile, leaving a uniform thickness or depth of sand beneath it. The cut-off sand remains on top of the valve, and the hopper and valve are moved together through the operation of the piston 181 and rod 180, to a point to the left of the position shown in Figs. 29 and 30. Then the piston 178 and its rod 177, withdraw the gate valve and dump the surplus sand before the hopper is returned over another flask.

Having described my invention, I claim,—

1. A molding apparatus having in combination a circular table provided with an endless series of flask-supports, means for intermittently moving said table and supports in a circular path step-by-step; a sand delivery station adjacent to the path of the supports; means for snowing sand over the flask-supports in succession as the latter come to rest at the sand station; a press-station also adjacent to the path of the supports; a press carrying a pattern; fluid-pressure piston means for operating the press to embed the pattern in the snowed sand and fluid-pressure piston means for compressing the sand about the pattern while the same is held by the piston in the sand.

2. A molding apparatus having in combination a series of flask-supports, means for moving said supports; a sand-station past which the supports travel; a shaking screen at said station; a hopper beneath the shaking screen and movable into register with the flask-supports in succession said hopper having a series of shutters therein to break the fall of the sand; a press-station; a press, and means for moving the press toward the flask-supports one after the other.

3. A molding apparatus having in combination an endless series of flask-supports, means for moving said supports intermittently; a sanding station; a hopper pivotally sustained over the path of the supports; a slide valve for the hopper; means for vertically rocking the hopper toward and from the supports as they are successively brought beneath the hopper; means for operating the hopper slide-valve; a press carrying a pattern and means for operating the press to present the same to the successive flask-supports.

4. A molding apparatus having in combination an endless series of flask-supports, means for moving said supports intermittently; a sanding station; a hopper pivotally sustained over the path of the supports; pneumatic means for rocking the hopper toward and from the path of the flask-supports; shutter means for breaking the fall of the sand and delivering it in a snowed condition over the flask-supports; a pattern and press-means for compressing the sand about the pattern.

5. A molding apparatus having in combination an endless series of flask-supports, means for moving the supports; a rocking frame carrying a sand hopper over the path of the flask-supports; a gate-valve in said hopper; means for rocking the frame and hopper; means for actuating the gate valve; means for moving the hopper with respect to the frame; a pattern, and a press operating to compress the sand about the pattern.

6. A molding apparatus having in combination an endless series of flask-supports, means for moving the supports; a sand feed mechanism; a movable hopper over the path of the flask-supports; shutter devices coacting with the hopper to deliver the sand over the flask-supports in a fluffy condition; a single pattern carrier and pattern carried thereby to register successively with each flask-support, and a press device also over the path of the flask-supports to compress the sand about the pattern.

7. A molding apparatus having in combination an endless series of flask-supports, means for moving said supports; a sand-delivery mechanism; a fluid-actuated hopper-frame; a hopper carried by said frame; fluid-operated means for moving the said hopper independently of the frame and a fluid-actuated valve for said hopper.

8. A molding apparatus having in combination an endless series of flask-supports, means for moving said supports; an endless series of devices for delivering sand; a movable hopper over the path of the flask-supports; shutter devices coacting with the hopper to deliver the sand in a snowed condition over the flask-supports; a single pattern carrier and pattern carried thereby, means for successively embedding the pattern in the snowed sand over each flask support and a press for compressing the snowed sand about the pattern.

9. The combination with a traveling conveyer, of an endless series of supports on the conveyer for flasks; means for successively delivering sand to the supports and flasks; a press over the path of the traveling supports and flasks; a pattern carried by the press and moved by the latter into the loose sand; fluid pressure means for actuating the press; means movable independent of the pattern for compressing the sand about the latter; fluid pressure means for operating said compressing means and means carried by the press devices for confining the sand against lateral displacement.

10. The combination with a traveling-conveyer, of an endless series of supports on the conveyer for flasks; means for successively delivering sand to the supports and flasks; a press over the path of the traveling supports and flasks; a pattern carried by the press and moved by the latter into the loose sand; plunger means for compressing the sand about the pattern and means carried by the press means and in advance of the pattern for retaining the sand against lateral displacement.

11. The combination with a traveling conveyer, of an endless series of supports on the conveyer for flasks; means for delivering sand to the successive flasks; a press carrying a pattern; fluid pressure means for operating the press for moving the latter and pattern toward the sand-filled flasks in succession and an air blast for clearing the conveyer of sand after it passes the press.

12. The combination with a circular carrier having supports for flasks, of a vertically-movable gate rod movable through each flask support; means for delivering sand to the flasks on top of said rods; a single press carrying a pattern to successively register with the several flasks; means for operating the press, and a cam track for moving the gate-rods forward through the flask-supports and back during one rotation of the carrier whereby to form gate holes in the sand in each flask.

13. The combination with a circular carrier having supports for flasks, of a gate rod movable through each flask support; means for delivering sand to the flasks; a single press carrying a pattern to successively register with the several flasks; means for operating the press; a cam track for moving the gate rods forward through the flask-supports and flasks thereon as they approach the press and then retract them as they leave the press and means for yieldingly sustaining the gate-rods while they are beneath the press.

14. A molding apparatus having in combination an endless series of flask-supports, means for moving said supports, a sand-delivery mechanism; a pivoted hopper-frame; a piston connected to and rocking said frame; a hopper carried by and moving with said frame; a piston for moving the hopper independently of the frame and a fluid-actuated slide valve in said movable hopper.

15. A molding apparatus having in combination an endless series of flask-supports, means for moving said supports, a sand-delivery mechanism; a pivoted hopper-frame; fluid-actuated means for rocking said frame; a hopper beneath the sand-delivery mechanism said hopper having a series of inclined shutters therein; a gate-valve beneath said inclined shutters, means for reciprocating the hopper and independent means for moving the gate valve.

16. A molding apparatus having in combination a circular table to carry flasks thereon, means for moving the table intermittently, a sand-receiving station adjacent to the table, a cylinder carrying a piston over the said table, a press carried by and movable with the piston, means for counterbalancing the piston and press and fluid-pressure connections with the cylinder.

17. A molding apparatus having in combination a circular table to carry flasks thereon, means for moving the table intermittently, sand-receiving station adjacent to the table, a piston over the said table, a box carried by the piston said box having a cylinder therein, a piston in said box cylinder said latter piston having a stem, pattern and stripper devices carried by the said stem and its piston and automatic means for controlling the said two pistons.

18. A molding apparatus having in combination a circular table to carry flasks thereon, an oscillating arm beneath the table, a rotary device carrying means to oscillate said arm and intermittently move the table, a valve device having a series of arms, means on the rotary device for actuating the valve arms one at a time to impart a partial movement to the valve, a fluid actuated press above the table and connection between the valve and press, whereby the rotary device will move the table intermittently and also operate the valve.

In testimony whereof I affix my signature.

ELLIS B. LONG.